March 21, 1939.  F. P. WHITAKER  2,151,576
GRID-CONTROLLED MERCURY ARC DISCHARGE DEVICE OR RECTIFIER
Filed July 9, 1936
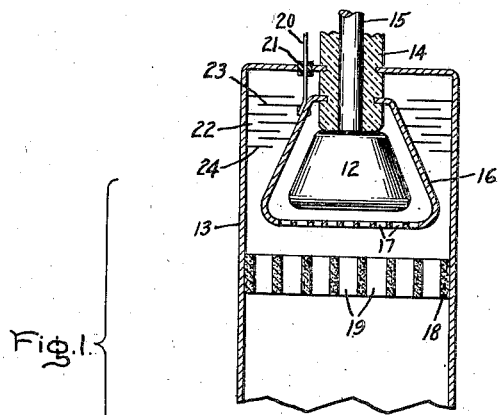
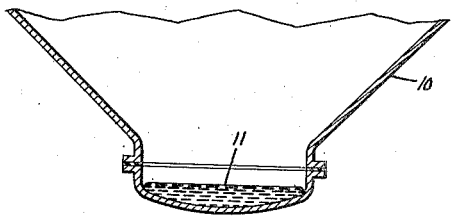
Fig. 1.
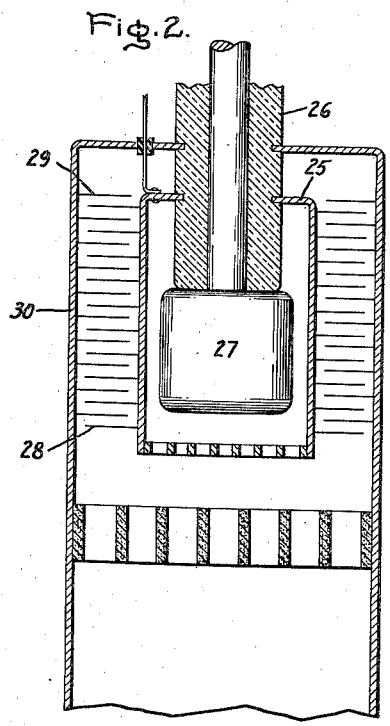
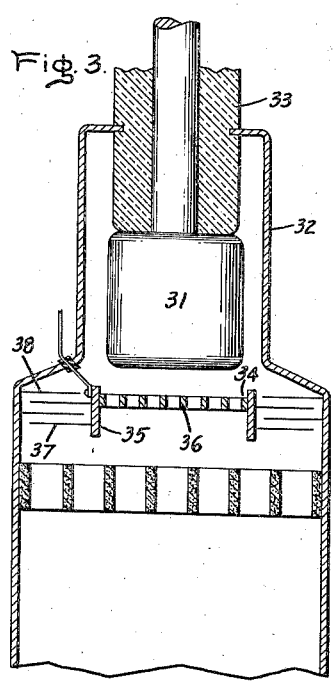
Inventor:
Frank P. Whitaker,
by Harry E. Dunham
His Attorney.

UNITED STATES PATENT OFFICE 2,151,576

GRID-CONTROLLED MERCURY ARC DISCHARGE DEVICE OR RECTIFIER

Frank P. Whitaker, Rugby, England, assignor to General Electric Company, a corporation of New York Application July 9, 1936, Serial No. 89,819
In Great Britain August 28, 1935

10 Claims. (Cl. 250—27.5)

My invention relates to grid-controlled mercury arc discharge devices or rectifiers, and particularly to grid-controlled mercury arc rectifiers used in connection with inverters, or converting apparatus for changing direct current to alternating current.

It is well known that the output voltage of grid-controlled arc discharge devices or rectifiers may be varied by changing the firing angle or phase of the grid voltage with respect to the voltage impressed on the anodes, and that the operation of inverters is dependent on the use of grids to select the correct moment of ignition for each anode. It is also well known to connect condensers between the grid terminals and the cathode, or between grid terminals and negative grid bias means, for the prevention of voltage oscillations of the grid circuit, between these two points.

In accordance with the present invention the grids and shields or other elements of a mercury arc discharge device or rectifier are so constructed as to increase the natural or inherent capacity above that which exists in discharge devices having known forms of grids and shields or other elements. By my improved construction the external capacity heretofore required between grid terminals and cathode is eliminated partially, or wholly, and the prevention of oscillations in the grid circuit is rendered more effective. Instead of connecting the capacity between the grids and the anode shields it may be connected between the grids and the tank or between the grids and the cathode, or between the grids and the ionization.

My invention will be better understood from the following description when considered in connection with the accompanying drawing and its scope will be set forth in the appended claims.

Referring to the drawing, Fig. 1 is a diagrammatic view of a portion of a mercury arc discharge device or rectifier in which my invention has been embodied, and Figs. 2 and 3 are diagrammatic views illustrating modifications of the invention.

In Fig. 1 the numeral 10 designates the evacuated receptacle or tank of a mercury arc device or rectifier enclosing a cathode 11 and preferably a plurality of anodes 12 only one of which is shown. The anode 12 is surrounded by an anode shield 13 secured to an insulator 14 surrounding the anode stem 15. A cone-shaped grid 16 surrounding the anode 12 and having openings 17 below the anode is supported from the insulator 14. A baffle 18 having openings 19 is supported below grid 16 in the shield 13. A conductor 20 which may be connected to a source of grid voltage (not shown) is connected to the grid 16 and insulated from the shield 13 by an insulator 21. In order to provide a relatively high internal capacity, a plurality of interleaved plates or washers 22 are provided in the space between the upper portion of the grid 16 and the shield 13, alternate washers 23 being connected to the grid 16 while the remainder of the washers 24 are connected to the shield.

In Fig. 2 a cylindrical grid 25 supported by an anode insulator 26 surrounds an anode 27, and an internal capacity is provided constituted by two sets of interleaved plates or washers 28, 29 connected respectively to the cylindrical grid 25 and to an anode shield 30 supported from the anode insulator 26.

In Fig. 3 an anode 31 is surrounded by an anode shield 32 supported by an anode insulator 33. A grid 34, comprising an outer cylindrical member 35 and a central perforated plated member 36 is mounted below the anode 31. An internal capacity is provided constituted by two sets of interleaved plates 37, 38 connected respectively to the cylindrical member 35 of grid 34 and to the anode shield 32.

The internal capacity in accordance with my invention has been described herein as being constituted by interleaved plates, as shown, connected respectively to a grid and to another element, such as the anode shield. The internal capacity may, however, be in the form of a built-up unit, i. e., a separate condenser assembly, the opposite electrodes being connected respectively to the grid and to another element of the rectifier.

My invention is applicable to anode shields containing more than one grid, and the capacity may be connected between any grid and a shield or between all of the grids and the shield. It will be understood that in any of the above combinations, one side of the internal capacity or condenser may be connected to an element exposed to the ionized gas within the rectifier, or it may be connected to the tank, or to the cathode.

It will be understood that the additional capacity between the grids and the other parts mentioned can be obtained by other constructions than those hereinabove described.

My invention has been described herein in particular embodiments for purposes of illustration. It will be understood, however, that the invention is susceptible of various changes and modifications and that I intend by the appended claims to cover any such modifications as fall within the true spirit and scope of my invention.

What I claim as new and desire to secure by Letters Patent of the United States is:

1. In an electric system including a device of the grid-controlled type having an anode, said device having inherent capacity between the grid and a second element of said device insufficient to prevent oscillations in the grid-cathode circuit of said device, a supplemental internal capacity connected between said grid and said second element and providing together with said inherent capacity a total capacity of such value that oscillations in the grid-cathode circuit are prevented.

2. In an electric system including a mercury arc discharge device having at least one anode, an anode shield surrounding said anode, and at least one grid within said shield, said device having inherent capacity between said grid and said shield insufficient to prevent oscillations in the grid-cathode circuit of said device, a supplemental internal capacity connected between said grid and said shield and providing together with said inherent capacity a total capacity of value sufficient to prevent oscillations in the grid-cathode circuit of said device.

3. In an electric system including a mercury arc discharge device having at least one anode, an anode shield surrounding said anode, and at least one grid within said shield, said device having inherent capacity between said grid and said shield insufficient to prevent oscillations in the grid-cathode circuit of said device, supplemental capacity comprising two interleaved sets of condenser plates, one set being connected to said grid and the other set being connected to said shield, said supplemental capacity providing together with said inherent capacity a total capacity of value sufficient to prevent oscillations in the grid-cathode circuit of said device.

4. A mercury arc discharge device having an anode, an anode shield surrounding said anode, a grid within said shield having a side wall portion surrounding said anode, and a capacity comprising two interleaved sets of condenser plates, one set being connected to the side wall of said grid and the other set being connected to said shield.

5. A mercury arc discharge device having an anode, an anode shield surrounding said anode, a grid mounted in said shield adjacent to the tip of said anode, and a capacity comprising two interleaved sets of condenser plates, said sets of plates being connected respectively to said grid and to said shield.

6. A mercury arc discharge device of the grid-controlled type having an anode and a cathode, said device having inherent grid-to-cathode capacity insufficient to prevent oscillations in the grid-cathode circuit of said device, and a supplementary internal grid-to-cathode capacity providing together with said inherent capacity a total grid-to-cathode capacity of such value that oscillations in the grid-cathode circuit are prevented.

7. A mercury arc discharge device having a cathode and at least one anode, an anode shield surrounding said anode, at least one grid within said shield, said device having inherent grid-to-cathode capacity insufficient to prevent oscillations in the grid-cathode circuit of said device, and a supplementary internal capacity connected between said grid and said shield and providing together with said inherent capacity a total internal grid-to-cathode capacity of such value that oscillations in the grid-cathode circuit are prevented.

8. A mercury arc discharge device having a cathode and an anode, an anode shield surrounding said anode, a grid within said shield, said device having inherent grid-to-cathode capacity insufficient to prevent oscillations in the grid-cathode circuit of said device, and a supplementary capacity comprising two interleaved sets of condenser plates, one set being connected to said grid and the other set being connected to said shield, said supplementary capacity providing with said inherent capacity a total internal grid-to-cathode capacity of such value that oscillations in the grid-cathode circuit are prevented.

9. A mercury arc discharge device having an anode, a cathode, an anode shield surrounding said anode, a grid having openings therein, an internal capacity connected between said grid and said shield, and means to prevent flow of the arc discharge in said device through said capacity and to cause all of said arc discharge to pass through said grid openings.

10. A mercury arc discharge device having an anode, a cathode, an anode shield surrounding said anode, a grid, an internal capacity connected between said grid and said shield, and means to prevent substantially completely any flow through said capacity of the arc discharge in said device.

FRANK P. WHITAKER.